US012606028B2

(12) United States Patent
Miels et al.

(10) Patent No.: US 12,606,028 B2
(45) Date of Patent: Apr. 21, 2026

(54) METHOD FOR DETECTING A LOWERING OF A CURRENT COLLECTOR OF A VEHICLE

(71) Applicant: ALSTOM Holdings, St Ouen-sur-Seine (FR)

(72) Inventors: Torsten Miels, Berlin (DE); Rico Pust, Senzig (DE)

(73) Assignee: ALSTOM Holdings, St Ouen-sur-Seine (FR)

( * ) Notice: Subject to any disclaimer, the term of this patent is extended or adjusted under 35 U.S.C. 154(b) by 534 days.

(21) Appl. No.: 18/131,054

(22) Filed: Apr. 5, 2023

(65) Prior Publication Data

US 2023/0322090 A1     Oct. 12, 2023

(30) Foreign Application Priority Data

Apr. 7, 2022     (EP) ..................................... 22305484

(51) Int. Cl.
| | |
|---|---|
| *B60L 5/10* | (2006.01) |
| *B60L 3/00* | (2019.01) |
| *B60L 3/04* | (2006.01) |
| *B60L 3/12* | (2006.01) |
| *B60L 5/24* | (2006.01) |
| *B60L 5/28* | (2006.01) |

(Continued)

(52) U.S. Cl.
CPC    *B60L 5/10* (2013.01); *B60L 3/00* (2013.01); *B60L 3/04* (2013.01); *B60L 3/12* (2013.01); *B60L 5/24* (2013.01); *B60L 5/28* (2013.01);

*B60L 5/38* (2013.01); *B60L 9/00* (2013.01); *B60L 9/005* (2013.01); *B60L 2200/26* (2013.01)

(58) Field of Classification Search
CPC .......... B60L 2200/26; B60L 3/00; B60L 5/38; B60L 3/04; B60L 3/12; B60L 5/24; B60L 5/28; B60L 9/005; B60L 9/00; B60L 5/10
See application file for complete search history.

(56) References Cited

U.S. PATENT DOCUMENTS

| | | | | | |
|---|---|---|---|---|---|
| 6,321,170 | B1 * | 11/2001 | Wurgler | ................. | B60L 9/005 |
| | | | | | 246/187 A |
| 9,227,516 | B2 * | 1/2016 | Hatanaka | .................. | B60L 9/22 |
| 9,587,995 | B2 * | 3/2017 | Grattan | ..................... | B60L 5/20 |

(Continued)

FOREIGN PATENT DOCUMENTS

| | | | | |
|---|---|---|---|---|
| DE | 102017215135 | A1 | 2/2019 | |
| EP | 2275300 | A1 * | 1/2011 | .............. B60L 50/53 |

(Continued)

*Primary Examiner* — Cheng Lin
(74) *Attorney, Agent, or Firm* — Downs Rachlin Martin PLLC

(57)     ABSTRACT

A method is presented for detecting a lowering of a current collector of a vehicle, in particular a rail vehicle, from a contact line, the method comprising: determining values of the electric current intensity of an electric current that is transmitted or flows between the contact line and the current collector in a measuring period; determining values of a current component of the electric current with the aid of the values of the electric current intensity; detecting the lowering with the aid of the values of the current component and a predefined criterion. Furthermore, a corresponding apparatus and a vehicle comprising the apparatus are disclosed.

20 Claims, 2 Drawing Sheets

(51) Int. Cl.
    *B60L 5/38*        (2006.01)
    *B60L 9/00*        (2019.01)

(56)           References Cited

U.S. PATENT DOCUMENTS

| | | | | |
|---|---|---|---|---|
| 9,845,013 | B2 * | 12/2017 | Sugahara | B60L 9/005 |
| 10,115,247 | B2 * | 10/2018 | Alm | B60L 3/04 |
| 2014/0042279 | A1 * | 2/2014 | Kadono | B61L 25/025 |
| | | | | 246/167 R |
| 2018/0312064 | A1 * | 11/2018 | Ahiko | B60L 5/38 |
| 2020/0269701 | A1 * | 8/2020 | Buehs | B60L 5/24 |

FOREIGN PATENT DOCUMENTS

| | | | | | |
|---|---|---|---|---|---|
| EP | 2644432 | A2 | 10/2013 | | |
| EP | 2955846 | A1 * | 12/2015 | | B60L 3/003 |

* cited by examiner

ST7-8

32

8

ST32-33

34

33

ST33-35

35

36

ST35-37

37

ST8-9     ST8-10     ST8-11

S1

WES

S2

WSAN

S3

RES

S4

METHOD FOR DETECTING A LOWERING OF A CURRENT COLLECTOR OF A VEHICLE

RELATED APPLICATION DATA

This application claims the benefit of priority of European Patent Application Serial No. 22 305 484.2, filed on Apr. 7, 2022, and titled "Method for Detecting a Lowering of a Current Collector of a Vehicle", which is incorporated by reference herein in its entirety.

FIELD OF THE DISCLOSURE

The disclosure relates to a method and an apparatus for detecting a lowering of a current collector of a vehicle, in particular a rail vehicle, and to a vehicle comprising the apparatus.

BACKGROUND

When vehicles with a current collector are in operation and/or stationary, the current collector can be lowered from the contact line so that a distance is formed between the current collector and the overhead contact line. To be more precise, this can be, in particular, the lowering of a contact element (for example a contact strip) of the current collector, which should normally slide along the overhead contact line, from the overhead contact line. The distance can be a few millimeters or centimeters.

A cause for the lowering can be, for example, a snow load or ice load. Such a load can build up slowly and continuously, for example during snowfall or a cold spell. Another cause can be, for example, a pressure drop of a holding system, for example a hydraulic or pneumatic system, which is intended to hold the current collector (especially its contact element) in a position suitable for current collection. The reason for this can be a technical defect. Other causes for the lowering are also possible, for example deformations of a linkage of the current collector due to the influence of temperature and/or time. The current collector can be a pantograph, for example.

If there is a contact break between the current collector (more precisely, between the contact element of the current collector) and the overhead contact line, an arc usually forms. An arc can damage the components involved, especially the contact line and the current collector and its contact element. It may even cause a contact line break, which is a dangerous event. Damage and a contact line break can occur in particular when the vehicle is at a standstill. Damage is caused in particular by high temperatures at the base of the arc, i.e. in material areas where the arc originates or is absorbed. A contact line break can occur after only a few minutes during standstill. There may be various reasons why it is generally desirable for the current collector to be in contact with the contact line even when the vehicle is stationary. For example, it may be desirable to maintain the charge of a battery of the vehicle, or a heating system, an air conditioning system or other consumers of the vehicle may require electrical energy even when the vehicle is stationary. Thus, it can be expedient not to lower the current collector during a shorter standstill (for example during a station stop) or during a longer standstill (for example over several hours or days).

During snowfall, it is known to lower the current collector in advance when the vehicle is parked. This procedure requires the current collector to be raised again, for example if a journey is to be continued.

It is known, for vehicles having two system-compatible current collectors, to raise the second current collector when the first current collector is lowered, i.e., to perform a change of current collectors. This procedure cannot be applied for vehicles having only one system-compatible current collector.

SUMMARY OF THE DISCLOSURE

It is an object of the present invention to detect a lowering of a current collector of a vehicle from a contact line in a technically simple manner. Another object is to create a simple prerequisite for avoiding hazards and damage to components involved due to arcs between the contact line and the current collector. Thus, it is an object to increase the operational safety of the vehicle. It is also an object to protect components of the vehicle (for example of the primary electric circuit).

According to a basic idea of the present invention, a lowering of the current collector is identified with the aid of values of the electric current intensity of an electric current that is transmitted or flows between a contact line and a current collector of a vehicle. In this case, values of a current component, in particular a direct current component or an alternating current component, the frequency of which is below a predefined frequency, are determined. A determination can be carried out in particular with the aid of a (for example hardware- or software-based) low-pass filter. The electric current that is transmitted or flows between a contact line and a current collector of a vehicle can be, in particular, an alternating current or can have an alternating current component. In particular, it can be an alternating current in the normal state (without lowering or arcing). In the case of lowering, it can be an alternating current superimposed on the current component (which can, in particular, be a direct current component or an alternating current component with a lower frequency).

The invention is based, inter alia, on the finding that the electric current usually forms an arc, in particular an unstable arc, when the current collector is lowered. In particular, at a moment when the value of the electric current intensity of the electric current is low (in the case of changing values of the electric current intensity due to alternating current), such an unstable arc may be formed briefly. The term "unstable" means that the arc ignites and extinguishes continuously in time. Ignition and extinction can occur within milliseconds or tens or hundreds of milliseconds, for example.

Continuous extinguishing and ignition of the unstable arc leads to gaps in a time course of the values of the electric current intensity of the electric current.

The invention is further based on the finding that the continuous extinction and ignition of the unstable arc is expressed in the values of the electric current intensity of the electric current as an additional low-frequency current component or as a direct current component when the values of the electric current intensity are considered in a time course.

The invention is further based on the knowledge that an unstable arc is formed in particular when the current collector is lowered if the current collector and the contact element are covered and weighed down by snow or ice and/or if temperatures below the freezing point (zero degrees Celsius) prevail in the vicinity of the arc. The method can therefore be carried out in particular when the ambient temperature is below the freezing point or when there is snow or ice on the current collector.

The invention is further based on the finding that an unstable arc is formed in particular when the vehicle is stationary.

In particular, what is proposed is a method for detecting a lowering of a current collector of a vehicle, in particular a rail vehicle, from a contact line, comprising the steps of determining values of an electric current intensity of an electric current that is transmitted or flows between the contact line and the current collector in a measuring period; determining values of a current component of the electric current by means of the values of the electric current intensity; and detecting the lowering by means of the values of the current component and a predefined criterion.

The rail vehicle may be, for example, a railcar or a powerless carriage, for example of a high-speed train, an express train, a regional train, a light rail vehicle, a tram or an underground railway train. The lowering of the current collector from the contact line can in particular mean a lowering of a contact element (for example a contact strip) of the current collector and/or a lowering of at least a part of the current collector (for example a part to which a contact element or a contact strip is attached). Other, for example non-rail-mounted vehicles are also possible, for example a trolley truck.

Values of the electric current intensity (the unit can be amperes) can be determined in particular with the aid of a determination device. The determination device can have a current measuring device or can be connected to a current measuring device. The current measuring device can be an ammeter, for example. The determination device can, for example, be attached to a primary circuit of the vehicle or can be connected to a primary circuit of the vehicle. Values of the electric current intensity can be measured with the aid of the current measuring device directly at the current collector or at a contact element of the current collector or at an electrically connected component, for example a connected power line of the rail vehicle, in particular of the primary circuit of the rail vehicle.

The determination device can comprise a computing device, for example a computer or a control device, which can in particular comprise an input device (for example an input interface, for example from the current measuring device), an output device (for example an output interface or a display, for example a monitor), a fixed memory, a working memory and/or a processor.

A method according to the invention can be carried out automatically, in particular, for example, using said computing device or another computing device and/or other control device. Values of the electric current intensity and possibly further steps of the method (possibly all further steps) can be determined, for example, during operation or during a stationary period of the vehicle, for example, continuously or at regular or irregular intervals. The execution of the method according to the invention can also be initiated by a human user (for example by a train driver or other operator), for example with the aid of a button.

The measurement period can be predefined. For example, the measurement period can be a minimum of 100 milliseconds or 200 milliseconds or 500 milliseconds or 1 second or 2 seconds and/or a maximum of 200 milliseconds or 500 milliseconds or 1 second or 2 seconds or 5 seconds. Other lower or upper limits are possible.

In particular, the electric current can be alternating current or can have alternating current components. In particular, the electric current can be an alternating current or can have an alternating current component in the case where there is normal contact between the contact line and the current collector. A transfer or flow of the electric current can in particular mean that an arc transfers charge carriers or a flow of charge carriers occurs between the contact line and the current collector when the contact line and the current collector are in contact. It is conceivable that both a transfer of charge carriers by the arc and a flow of charge carriers occurs during the measurement period when the contact line and the current collector are in contact.

The values of the current component (the unit can be amperes) can be determined in particular with the aid of the determination device or a further determination device which can be connected to the determination device or can be part of the determination device itself. The further determination device can comprise a computing device, for example a computer or a control device, which can in particular comprise an input device (for example an input interface, for example from the current measuring device), an output device (for example an output interface or a display, for example a monitor), a fixed memory, a working memory and/or a processor.

The electric current that is transmitted or flows between the contact line and the current collector of the vehicle, as already mentioned, can, in particular, be an alternating current or can have an alternating current component. The current component can, in particular, be a direct current component or an alternating current component of which the frequency is below a predefined frequency. The values of the current component can be determined, for example, with the aid of a low-pass filter. The low-pass filter can, for example, be hardware-based (implemented by electrical components) or software-based (implemented by program code). The maximum frequency allowed by the low-pass filter can be predefined and can be, for example, between 0.1 Hertz or 1 Hertz (lower limit) or 5 Hertz or 10 Hertz or 20 (upper limit) Hertz. The upper limit can, in particular, be below the frequency of a traction current in the overhead contact line.

The lowering is detected with the aid of the values of the current component and a predefined criterion.

The expression "with the aid of the values of the current component" means in particular that the values of the current component are taken into account and/or evaluated.

The expression "with the aid of the predefined criterion" means in particular that the predefined criterion is applied. Reference can also be made to a predefined criterion if the procedure for applying the criterion is predefined, but the criterion is not ultimately defined, however, until after the values of the current component are available, for example, a limit value is defined.

The criterion can include that the values of the current component exceed a predefined identification threshold, for example that a number of values of the current component exceed a predefined current intensity within a minimum time interval and/or that the number of values falls below a predefined frequency within the minimum time interval or a further minimum time interval.

The detection can be carried out in particular with the aid of a detection device. The detection device can comprise a computing device, for example a computer or a control device, which can in particular comprise an input device (for example an input interface, for example of the determination device and/or the further determination device), an output device (for example an output interface), a fixed memory, a working memory and/or a processor. The determination device and/or the further determination device and/or the detection device can constitute a common device. The detection can have as a result, for example, a message, for example output by an output device, signifying that a lowering has been detected.

The lowering can be understood in the sense of an increase in the distance between the contact line and the current collector. The increase may already have ended at the time of detection—i.e. the application of the method according to the invention—for example when a snow load on the current collector is constant. The lowering can therefore be understood as a distance between the contact line and the current collector with respect to a set position of the current collector, in particular of a contact element of the current collector. In the set position of the current collector, the current collector and the contact line are in contact.

A lowering does not necessarily have to continue at the time of application of the method according to the invention in the sense that a distance between the contact line and the current collector still increases. However, it is not ruled out that the distance between overhead contact line and current collector increases at the time of application of the method according to the invention. The lowering can also be understood as a continuous process in which the distance increases. The lowering can alternatively or additionally be understood as a distance between current collector and overhead contact line. The distance can be caused by a prior or continued lowering.

If the lowering is detected, a protective measure can be taken, for example with the aid of a protective device. Such a protective measure can, for example, prevent further formation of the arc.

The presented method solves the object of detecting a lowering of a current collector of a vehicle in a structurally and technically simple manner. It can be implemented cost-effectively, for example on a primary circuit of the rail vehicle. In this way, a prerequisite can be created to avoid dangers and damage to involved components due to arcs between the contact line and the current collector and to increase the operational safety of the vehicle. The primary circuit can also be protected against currents for which it is not designed.

According to an advantageous embodiment of the method according to the invention, it additionally comprises the step of initiating and/or executing a protective measure when the lowering has been detected.

The protective measure can be designed to avoid hazards or damage to involved components due to arcing in the case of lowering and thus to increase operational safety in the case of lowering or afterwards. In particular, the protective measure can be designed to terminate and/or extinguish and/or avoid the arc and/or to warn/inform a human operator, for example a train driver, and/or to warn/inform passengers/humans in the vicinity. The protective measure can also include maintaining or restoring an operational capability of the vehicle. The protective measure can be initiated and/or executed in particular automatically, for example with the aid of a protective device. The protective device can in particular comprise, for example, a control device and/or a computer and/or an output device (for example, a loudspeaker, a screen, an LED display or a vibrating element) and/or an actuator (for example, a displacement-controlled or a force-controlled actuator).

In an advantageous embodiment of the method according to the invention, the protective measure comprises an interruption of the electric current or an output of a warning signal.

The electric current can be interrupted with the aid of a switch. The switch can be electrically connected to the current collector. For example, it can be a switch on a primary circuit of the vehicle. Automatic actuation, for example with the aid of a control device, is possible. Automatic actuation can occur when the arc has been detected.

The warning signal can be output in particular with the aid of an output device. It can, for example, be a visual or acoustic or haptic warning signal. Accordingly, the output device can be, for example, a loudspeaker in the case of an acoustic warning signal; a screen or an LED display or an LED in the case of a visual warning signal; a vibrating element in case of a haptic warning signal.

Said switch and/or said control device and/or said output devices can be part of a protective device or can be connected to a protective device. Said control device can form a common device together with a determination device and/or a detection device.

The interruption of an electric current or the output of a warning signal are technically easily implemented, cost-effective and efficient protective measures. The protective measures can be implemented simply, in particular with the aid of technical devices already present on the vehicle, and/or automatically. For example, the output device can be a loudspeaker present in or on the vehicle or a screen present in or on the vehicle.

In an advantageous embodiment of the method according to the invention, the protective measure comprises changing a holding force of the current collector or moving the current collector.

With the measures mentioned, the contact of the current collector, in particular of a contact element of the current collector, to the contact line can be restored if necessary. The holding force can be changed, for example, with the aid of a force-controlled actuator. The current collector can be moved, for example, with the aid of a displacement-controlled actuator. The force-controlled actuator and/or the displacement-controlled actuator can be part of a protective device or can be connected to a protective device.

The proposed protective measures are technically easily implemented, cost-effective and efficient protective measures that can prevent an arc and maintain or restore the operability of the vehicle, especially automatically, possibly without human intervention.

In an advantageous embodiment of the method according to the invention, the current component is a direct current component or the current component is an alternating current component of which the frequency value is below a predefined frequency value.

Reference is made to the above remarks which can apply to such an embodiment. It has been shown that arcs which occur in the case of lowering usually cause such a current component. Such current components are easily detectable by simple means, for example with the aid of a low-pass filter. In particular, they are easy to detect if the actual traction current is an alternating current.

In an advantageous embodiment of the method according to the invention, the values of the electric current intensity are determined in a time course.

This means that the values of the electric current intensity can be determined in a time sequence over the measurement period. A determination of the values of the electric current intensity in a time course can be carried out in particular in order to be able to identify the current component with a high degree of certainty and as unambiguously as possible. The values of the current component can also be determined according to the time course. The quality of the detection of the lowering is improved. In particular, the quality of the detection can be improved if the time course comprises a predefined minimum period, for example 0.1 second or 1 second or 2 seconds or 5 seconds.

In an advantageous embodiment of the method according to the invention, the vehicle is stationary.

Reference is made to the above remarks, which can apply to such an embodiment. When the current collector is stationary, there is basically a greatly increased risk of damage to the components involved, in particular the contact line and the current collector, when the current collector is lowered. In particular, a contact line break may occur after a few minutes. If the vehicle is at a standstill, the gain in operational safety is therefore particularly high.

Furthermore, what is proposed is an apparatus for detecting a lowering of a current collector of a vehicle, in particular a rail vehicle, from a contact line, comprising: a determination device designed to determine values of the electric current intensity of an electric current that is transmitted or flows between the contact line and the current collector in a measurement period, wherein the determination device is additionally designed to determine values of a current component with the aid of the values of the electric current intensity, or the apparatus comprises a further determination device adapted to determine values of a current component with the aid of the values of the electric current intensity; a detection device designed to detect the lowering with the aid of the values of the current component and a predefined criterion.

The apparatus can in particular be designed to carry out the method according to the invention. With regard to the apparatus, full reference is made to the explanations concerning the method according to the invention in all the embodiments presented. In particular, reference is made to the explanations concerning the determination device and the further determination device and the detection device. The stated advantages of the method according to the invention apply analogously to the apparatus according to the invention.

In an advantageous embodiment of the apparatus according to the invention, this comprises a protective device, designed to initiate and/or execute a protective measure when the lowering has been detected.

In particular, the apparatus can be designed to carry out the method according to the invention in an embodiment in which a protective measure is initiated or executed. With regard to the presented embodiment of the apparatus, full reference is made to the explanations concerning the method according to the invention, in particular to the embodiments in which a protective measure is initiated or executed. In particular, reference is made to the explanations concerning protective devices. The aforementioned advantages of the method according to the invention apply analogously to the presented embodiment of the apparatus according to the invention.

In an advantageous embodiment of the apparatus according to the invention, it has a low-pass filter.

The apparatus can in particular be designed to carry out the method according to the invention in an embodiment in which the determination of values of the current component is carried out using a low-pass filter. The low-pass filter of the apparatus according to the invention can in particular be part of the determination device or of the further determination device. The low-pass filter can, for example, be software-based and/or hardware-based.

With regard to the presented embodiment of the apparatus, full reference is made to the explanations concerning the method according to the invention, in particular to the embodiments in which a low-pass filter is used. In particular, reference is made to the explanations concerning the low-pass filter. The stated advantages of the method according to the invention apply analogously to the presented embodiment of the apparatus according to the invention.

Furthermore, a vehicle, in particular a rail vehicle, comprising the apparatus according to the invention is proposed. The vehicle can be, for example, an express train, a high-speed train, a regional train, a tram or an underground railway train or a light rail vehicle. Alternatively, the vehicle could be another type of vehicle, for example a trolley truck or a trolley bus.

BRIEF DESCRIPTION OF THE DRAWINGS

For the purpose of illustrating the disclosure, the drawings show aspects of one or more embodiments of the disclosure. However, it should be understood that the present disclosure is not limited to the precise arrangements and instrumentalities shown in the drawings, wherein.

DETAILED DESCRIPTION

Figure 1:
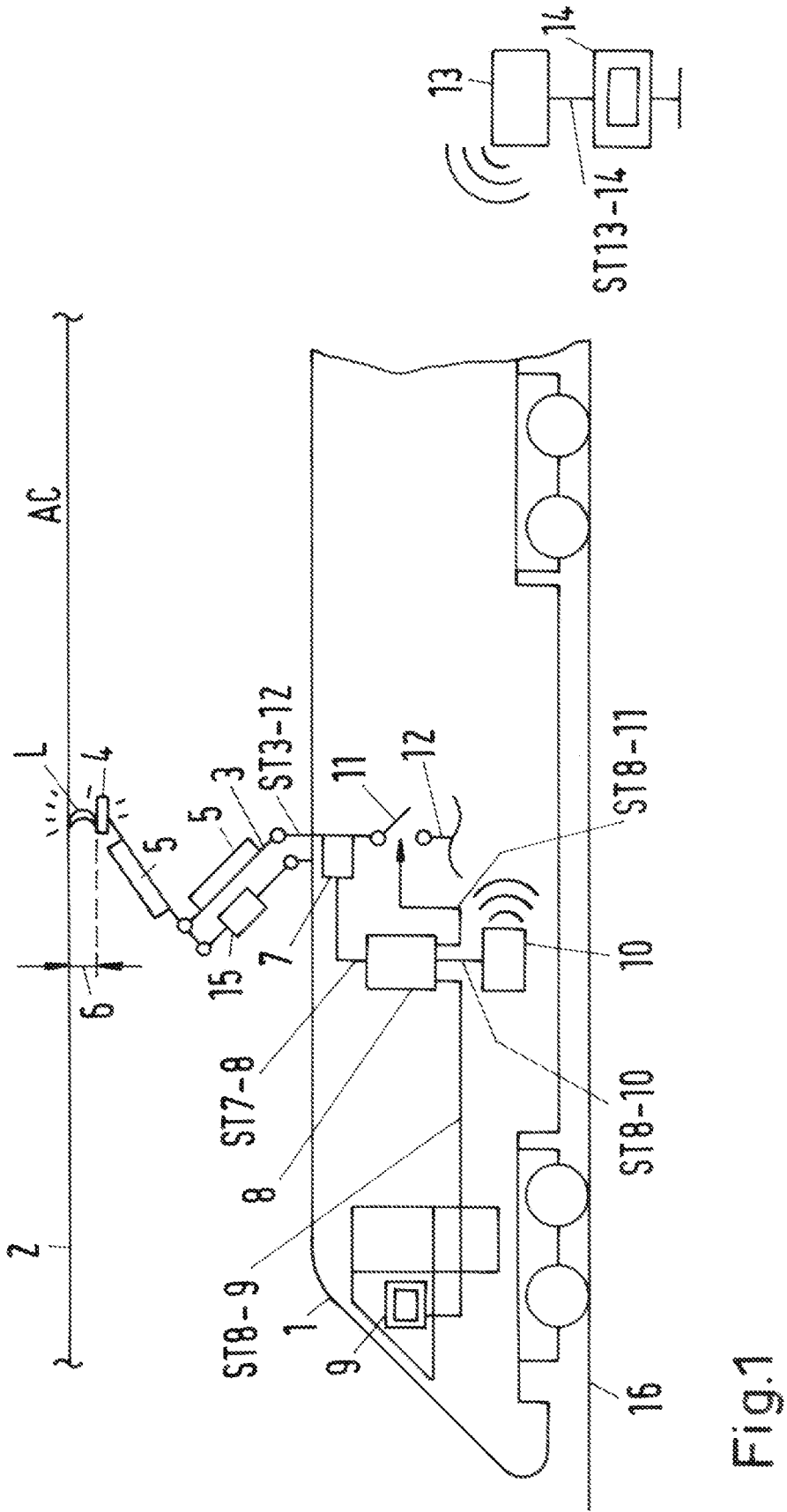
FIG. 1 shows a schematic view of an embodiment of the apparatus according to the invention device, partially mounted on or in a rail vehicle.

FIG. 1 shows a vehicle 1 that is embodied as a rail vehicle. It is located on rails 16. Furthermore, a contact line 2 is shown, which normally conducts an alternating current AC as traction current. The vehicle 1 has a current collector 3, which is embodied as a pantograph. Alternative embodiments are possible. The current collector 3 has a contact strip 4. The contact strip 4 is lowered from the contact line because snow and ice loads 5 are on the current collector and push it down towards the vehicle 1. There is therefore a lowering 6, which may have an extent in the region of millimeters or centimeters, for example. The lowering 6 is shown schematically with the aid of arrows. An electric current is transmitted between the contact line 2 and the contact strip 4 of the current collector 3 and forms an unstable arc L.

The current collector 3 is connected to a primary circuit 12 of the vehicle 1 via an electrically conductive interface ST3-12 (for example embodied as a current-carrying cable). The primary circuit 12 is only shown cut off. A current measuring device 7, for example embodied as an ammeter, is provided at the electrically conductive interface ST3-12, which serves to measure values of the electric current intensity of the electric current that is transmitted or flows between the contact line 1 and the current collector 3—also in the case shown in which the electric current is transmitted or flows via the arc L.

The electrically conductive interface ST3-12 further comprises an electric switch 11 which can disconnect the primary circuit 12 from a power supply through the contact line 2.

An identification and control device 8 is connected to the current measuring device 7 via a signal-conducting interface ST7-8 and is designed to identify the lowering 6 and initiate a protective measure. The identification and control device 8 is shown in detail in FIG. 2. The identification and control device 8 can have one or more computing devices or one or more computers. In particular, it can be embodied as a computer with its instances shown in FIG. 2. Reference is made to the following remarks concerning FIG. 2.

Signal-conducting interfaces can generally be designed, for example, as cables (for example, data cables or network cables) or wireless data connections (for example, radio or WLAN) or other data connections (for example, connections on a circuit board). Signal-conducting interfaces can be data interfaces in general. It is not ruled out that they can also be current-conducting or additionally serve to supply electrical energy.

The identification and control device 8 is connected to a first output device 9 via the signal-conducting interface ST8-9. The first output device 9 has a monitor. It is designed to display a warning message, for example to a train driver. It is located in a driver's cab of the rail vehicle. Alternatively, it could be located elsewhere in or on the rail vehicle. Such a display of a warning message is a first protective measure.

The identification and control device 8 is connected to a transmitting device 10 via the signal-conducting interface ST8-10. The transmitting device 10 is designed to transmit a warning signal to a receiving device 13 (for example by radio signal or mobile radio). The receiving device 13 is designed to receive the warning signal. The warning signal can then be forwarded to a second output device 14 via the signal-conducting interface ST13-14. The second output device 14 has a monitor. It is designed to display a warning message, for example to an attendant who is not on board the vehicle 1. The receiving device 13 and the second output device 14 can, for example, be located in a control center and/or an administration building.

The identification and control device 8 is connected to the electric switch 11 via the signal-conducting interface ST8-11. The electric switch 11 has an external signal input (shown as an arrow pointing to the switch) to which the signal-conducting interface ST8-11 is connected. The electric switch 11 is designed to be opened when a corresponding opening signal is received via the external signal input. By opening, a current flow into the primary circuit 12 and thus also the arc L can be prevented.

Figure 2:
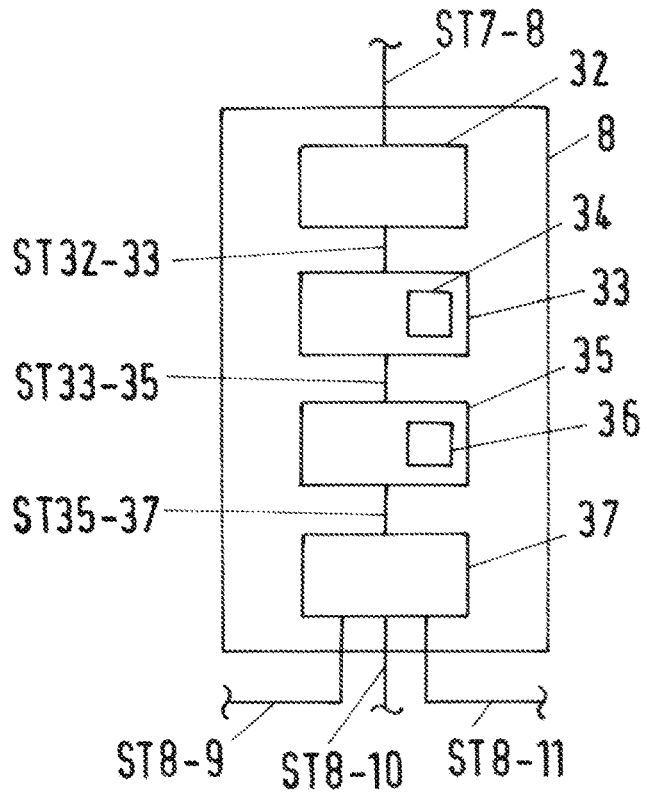
FIG. 2 shows a schematic view of an embodiment of an identification and control device control device.

FIG. 2 shows the identification and control device 8 in greater detail. The signal-conducting interface ST7-8 leads to a memory device 32. This is designed to store values of the electric current intensity of the electric current that is transmitted or flows between the contact line 2 and the current collector 3 in a measuring period, obtained with the aid of the current measuring device 7. The memory device 32 can be designed, for example, as a working memory (for example, RAM) or non-volatile memory (for example, a memory card or a solid-state drive or a hard disk).

The current measuring device 7 can be regarded as a first determination device designed to determine values of the electric current intensity of an electric current that is transmitted or flows between the contact line and the current collector during the measuring period.

The signal-conducting interface ST32-33 exists between the storage device 32 and a computing device 33 (which can be interpreted as a second determination device). The computing device 33 has a low-pass filter 34 which is designed to determine (for example, to filter out) values of a current component on the basis of the values of the electric current that is transmitted or flows between a contact line 2 and the current collector 3. The values of the current component can in particular be values of a direct current component and/or an alternating current component of which the frequency is below a predefined frequency. The predefined frequency is below the frequency of the alternating current AC. The low-pass filter 34 can be implemented in a software-based manner, i.e. the computing device 33 can be designed to implement the function of the low-pass filter with the aid of corresponding program code. The computing device 33 can have a memory on which such a program code is stored for execution. The computing device 33 can be designed as a computer.

The signal-conducting interface ST33-35 exists between the computing device 33 and a detection device 35. The detection device 35 is designed to identify lowering operations. Here, a lowering is detected if the values of the current component fulfil a predefined criterion 36. The predefined criterion 36 can be, for example: over a period of at least 0.5 seconds, values of the current component must exceed a minimum value. Meeting the criterion can be interpreted as an indication of the arc L that has occurred due to the lowering 6 and the detection of which is thus indicative of the lowering 6. The detection device 35 can be designed as a computer. The computing device 33 and the detection device 35 can be designed together as one or more computers. The computing device 33 can alternatively comprise the function of the detection device 35.

The signal-conducting interface ST35-37 exists between the detection device 35 and a signal output device 37. The signal output device 37 is designed to generate signals (for example warning or information signals) and to forward them via the signal-conducting interfaces ST8-9, ST8-10. Furthermore, it is designed to send the opening signal to the electric switch 11 via the interface ST8-11.

FIG. 1 also shows an actuator 15 on the current collector. It could also be controlled via a corresponding interface, not shown separately, between it and the signal output device 37, so that a change in a holding force or a movement of the current collector 3 (for example, that a lowering is compensated again so that the current collector 3 touches the contact line 2 again) is effected by means of a corresponding signal from the signal output device 37.

The entirety of the current measuring device 7 and the identification and control device 8 and the signal-conducting interface ST7-8 can also be regarded alternatively as a determination device. This determination device is designed to determine values of the electric current intensity of an electric current that is transmitted or flows between the contact line 2 and the current collector 3 and to determine values of the current component. In addition, a detection device 37 is integrated. This determination device can be designed, for example, as an ammeter with a connected computer.

When the lowering 6 of the contact strip 4 is present due to the snow and ice loads 5, the arc L occurs. The current measuring device 7 then measures changed values of the electric current that is transmitted or flows between the contact line 1 and the current collector 3. The storage device 32 stores these values of the electric current at least temporarily. Values of the current component (direct current component or alternating current component of which the frequency is below the predefined frequency) can be determined with the aid of the computing device 33 and the low-pass filter 34. If the values of the current component, determined by the detection device 37, meet the predefined criterion 36, a corresponding signal is sent via the signal-conducting interface ST35-37 to the signal output device 37, which in turn forwards the warning signals via the signal-conducting interfaces ST8-9, ST8-10 to the first output device 9 and the second output device 14. Thereupon, the warning signals are output as warning messages by the first output device 9 and the second output device 14. These are protective measures. In addition, the signal output device 37 sends the opening signal to the electric switch 11, which then opens. This is also a protective measure. Thus, the arc L can be extinguished or avoided. The signal output device 37 can also control the actuator 15 so that the current collector 3 touches the contact line 2 again. This is also a protective measure. The previously mentioned and explained interfaces are used for the processes mentioned in this paragraph. The components and units described as necessary to carry out the protective measures are all optional.

Figure 3:
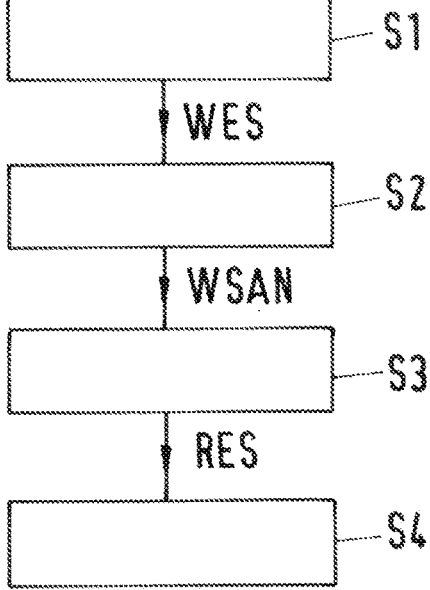
FIG. 3 shows a schematic view of an embodiment of the method according to the invention.

FIG. 3 shows an embodiment of the method according to the invention for detecting a lowering (which can be, for example, the lowering 6) of a current collector (for example, the current collector 3) of a vehicle (for example, the vehicle 1) from a contact line (for example the contact line 2). Reference is made fully to the description of the described embodiment of the apparatus according to the invention.

In a first step S1, values WES of the electric current intensity of an electric current that is transmitted or flows between the contact line 2 and the current collector 3 are determined in a time course over a measurement period, for example with the aid of the current measurement device 7. In a second step S2, values WSAN of a current component are determined on the basis of the values WES of the electric current intensity, for example with the aid of the identification and control device 8, in particular for example with the aid of the computing device 33 and the low-pass filter 34. In step S3, it is determined with the aid of a predefined criterion, which can for example be the predefined criterion 36, whether a lowering is present. If so, in a fourth optional step S4, mediated by a positive result RES (a signal indicating that a lowering is present), a protective measure is initiated, for example the output of a warning message by an output device, which can be the first output device 9 or the second output device 14, or sending an opening signal to an electric switch of a primary circuit (for example of the primary circuit 12) of the vehicle 1, which can be the electric switch 11, or controlling an actuator to change a position and/or height of the current collector so that the lowering 6 can be avoided.

The method can be repeated several times, also continuously, for example during operation or during a stationary period of the vehicle. The stated steps can be performed in chronological order, for example in such a way that the second step S2 is performed when the first step S1 is fully completed, the third step S3 is performed when the second step is fully completed, and the fourth step S4 is performed when the third step S3 is fully completed. Alternatively, the first step S1 can only take place partially, so that only some of the values WES of the electric current intensity in the measurement period are already processed in the second step S2 and in the third step S3 and possibly the fourth step S4. Repetitions of the second step S2, the third step S3 and, if necessary, the fourth step S4 can then take place with further values WES of the electric current intensity as soon as they have been determined.

Various modifications and additions can be made without departing from the spirit and scope of this disclosure. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present disclosure. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this disclosure.

Exemplary embodiments have been disclosed above and illustrated in the accompanying drawings. It will be understood by those skilled in the art that various changes, omissions and additions may be made to that which is specifically disclosed herein without departing from the spirit and scope of the present disclosure.

What is claimed is:

1. A method for detecting a lowering of a current collector of a vehicle, in particular a rail vehicle, from a contact line, the method comprising:
    determining values of an electric current intensity of an electric current that is transmitted or flows between the contact line and the current collector in a measuring period;
    determining values of a current component of the electric current by means of the values of the electric current intensity; and
    detecting the lowering taking into account the values of the current component;
    characterised in that the current component is a direct current component, or the current component is an alternating current component having a frequency value below a predefined frequency value.

2. The method according to claim 1, characterised in that it additionally comprises initiating and/or executing a protective measure when the lowering has been detected.

3. The method according to claim 2, characterised in that the protective measure comprises interruption of the electric current or output of a warning signal.

4. The method according to claim 2, characterised in that the protective measure comprises changing a holding force of the current collector or moving the current collector.

5. The method according to claim 1, characterised in that the values of the current component are determined with the aid of a low-pass filter.

6. The method according to claim 1, characterised in that the values of the electric current intensity are determined in a time course.

7. The method according to claim 1, characterised in that the vehicle is stationary.

8. The method according to claim 1, wherein the predetermined frequency value is selected based on behavior of an unstable arcing event between the current collector and the contact line curing the lowering.

9. The method according to claim 1, wherein the contact line carries a traction current, and the predetermined frequency value is selected to be lower than a frequency of the traction current.

10. The method according to claim 1, wherein the predetermined frequency is 10 Hertz or lower.

11. An apparatus for detecting a lowering of a current collector of a vehicle, in particular a rail vehicle, from a contact line, the apparatus comprising:
    a determination device designed to determine values of an electric current intensity of an electric current that is transmitted or flows between the contact line and the current collector in a measurement period,
    wherein the determination device is additionally designed to determine values of a current component by means of the values of the electric current intensity, or the apparatus comprises a further determination device designed to determine values of a current component by means of the values of the electric current intensity; and a detection device designed to detect the lowering taking into account the values of the current component, characterised in that the current component is a direct current component, or the current component is an alternating current component having a frequency value below a predefined frequency value.

12. The apparatus according to claim 11, characterised in that it comprises a protective device designed to initiate and/or execute a protective measure when the lowering has been detected.

13. The apparatus according to claim 11, characterised in that it comprises a low-pass filter.

14. A vehicle, in particular a rail vehicle, comprising an apparatus according to claim 8.

15. The vehicle according to claim 14, wherein the predetermined frequency value is selected based on behavior of an unstable arcing event between the current collector and the contact line curing the lowering.

16. The vehicle according to claim 14, wherein the contact line carries a traction current, and the predetermined frequency value is selected to be lower than a frequency of the traction current.

17. The vehicle according to claim 14, wherein the predetermined frequency is 10 Hertz or lower.

18. The apparatus according to claim 11, wherein the predetermined frequency value is selected based on behavior of an unstable arcing event between the current collector and the contact line curing the lowering.

19. The apparatus according to claim 11, wherein the contact line carries a traction current, and the predetermined frequency value is selected to be lower than a frequency of the traction current.

20. The apparatus according to claim 11, wherein the predetermined frequency is 10 Hertz or lower.

\* \* \* \* \*